United States Patent
Narukawa

(10) Patent No.: US 8,252,241 B2
(45) Date of Patent: Aug. 28, 2012

(54) APPARATUS FOR PRODUCING TRICHLOROSILANE AND METHOD FOR PRODUCING TRICHLOROSILANE

(75) Inventor: Mitsutoshi Narukawa, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 206 days.

(21) Appl. No.: 12/656,126

(22) Filed: Jan. 19, 2010

(65) Prior Publication Data

US 2010/0183496 A1    Jul. 22, 2010

(30) Foreign Application Priority Data

Jan. 20, 2009    (JP) ................ P2009-010358

(51) Int. Cl.
*B01J 8/24* (2006.01)
*B01J 8/34* (2006.01)
*B01J 8/38* (2006.01)
*C01B 33/107* (2006.01)

(52) U.S. Cl. ......... 422/139; 422/146; 422/200; 423/342

(58) Field of Classification Search .................. 422/139, 422/146, 200; 423/342
See application file for complete search history.

(56) References Cited

U.S. PATENT DOCUMENTS

| | | | |
|---|---|---|---|
| 2,539,415 A | 1/1951 | Garbo | |
| 2,584,391 A | 2/1952 | Leffer | |
| 2,590,465 A | 3/1952 | Ris | |
| 4,044,109 A | 8/1977 | Kotzsch et al. | |
| 4,176,710 A | 12/1979 | Gansauge et al. | |
| 4,424,198 A | 1/1984 | Ito et al. | |
| 5,063,040 A | 11/1991 | Ruff | |
| 7,641,872 B2 | 1/2010 | Inaba | |
| 2010/0074823 A1* | 3/2010 | Inaba | 423/342 |

FOREIGN PATENT DOCUMENTS

| | | |
|---|---|---|
| CN | 101125654 A | 2/2008 |
| EP | 0684070 A1 | 11/1995 |
| EP | 0776692 A1 | 6/1997 |
| EP | 2055674 A1 | 5/2009 |
| JP | 08-059221 A | 3/1996 |

OTHER PUBLICATIONS

European Search Report dated Jan. 30, 2009, issued on the European Application No. 08 16 6613.3.
European Search Report dated Aug. 25, 2010, issued for the corresponding European Patent Application No. 10151076.6.

* cited by examiner

*Primary Examiner* — Jennifer A Leung
(74) *Attorney, Agent, or Firm* — Edwards Wildman Palmer LLP

(57) ABSTRACT

An apparatus for producing trichlorosilane in which metallurgical grade silicon powder supplied to a reactor is reacted with hydrogen chloride gas while being fluidized by the hydrogen chloride gas, thereby discharging trichlorosilane generated by the reaction from the reactor, includes: a plurality of gas flow controlling members which are installed along a vertical direction in an annular shape R from an inner peripheral wall of the reactor in an internal space of the reactor; and a heat transfer tube which is installed along the vertical direction in the annular space R and through which a heating medium passes.

9 Claims, 4 Drawing Sheets

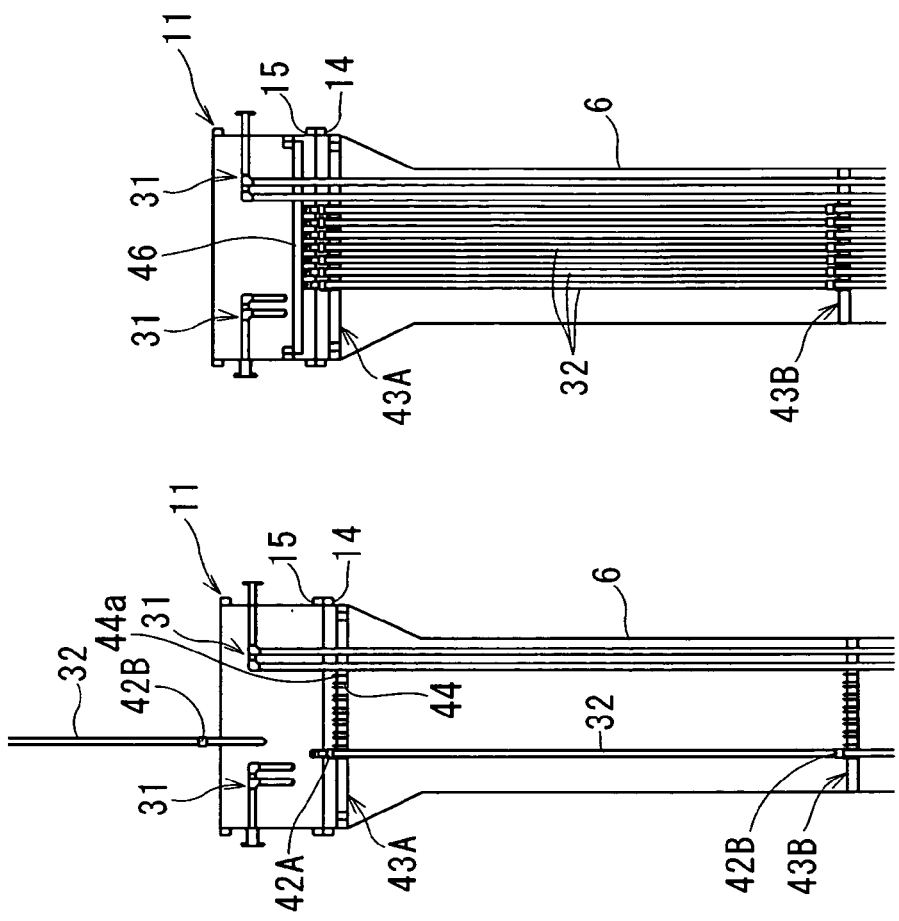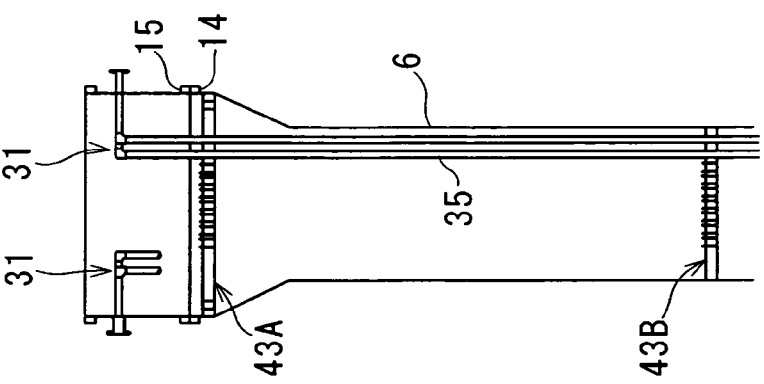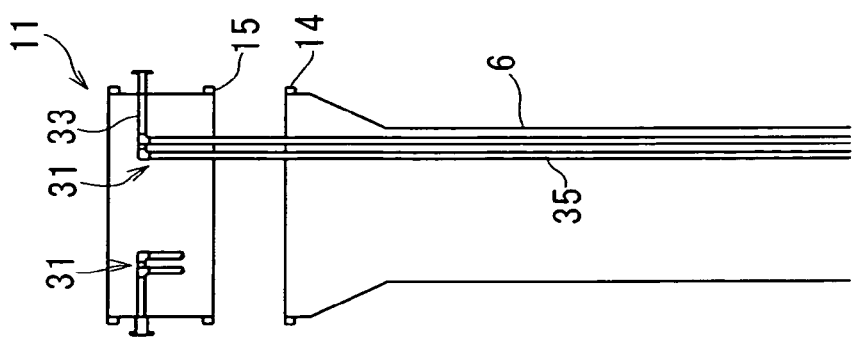

APPARATUS FOR PRODUCING TRICHLOROSILANE AND METHOD FOR PRODUCING TRICHLOROSILANE

BACKGROUND OF THE INVENTION

1. Field of the Invention

The present invention relates to an apparatus and method for producing trichlorosilane in which metallurgical grade silicon powder is reacted with hydrogen chloride gas while being fluidized by the hydrogen chloride gas, thereby producing trichlorosilane.

Priority is claimed on Japanese Patent Application No. 2009-10358, filed on Jan. 20, 2009, the content of which is incorporated herein by reference.

2. Description of Related Art

Trichlorosilane ($SiHCl_3$) used as a raw material for producing high purity silicon is produced by reacting metallurgical grade silicon powder (Si) of about 98% purity with hydrogen chloride gas (HCl).

The apparatus for producing trichlorosilane is, for example as disclosed in Japanese Unexamined Patent Application Publication No. H8-59221. The apparatus for producing trichlorosilane includes a reactor, a raw material supply device for supplying metallurgical grade silicon powder to the bottom of the reactor, and a gas introduction device for introducing hydrogen chloride gas with which metallurgical grade silicon powder is reacted. In the apparatus, the metallurgical grade silicon powder inside the reactor is reacted with hydrogen chloride gas while being fluidized with the hydrogen chloride gas, and the generated gas containing trichlorosilane is discharged from the upper part of the reactor. A heat transfer tube through which a heating medium flows in the vertical direction is provided inside the reactor. The provision of the heat transfer tube to be inserted into the reactor achieves a decrease in the temperature difference in a radial direction as compared with a provision in which the wall of the reactor is given a jacket structure into which a heating medium flows, thereby being easily adaptable to an increase in the size of the reactor.

SUMMARY OF THE INVENTION

Incidentally, according to the study of the present inventor, metallurgical grade silicon powder is fluidized at the lower part of the reactor by ascending hydrogen chloride gas which is introduced from therebelow, and the metallurgical grade silicon powder is contacted with the hydrogen chloride gas to cause a reaction during fluidization. The hydrogen chloride gas ascends as bubbles from the lower part to the upper part in the fluidized bed of the metallurgical grade silicon powder. However, in the meantime, the bubbles become greater at the upper part of the reactor than at the lower part thereof. When the bubbles of hydrogen chloride gas grow greater, there is a decrease in the contact area of the bubbles of hydrogen chloride gas with the metallurgical grade silicon powder, resulting in a lower efficiency of the reaction. However, the bubbles contact with (or collide against) the heat transfer tube inserted into the reactor along the vertical direction and are suitably divided, thereby allowing an effective reaction of the hydrogen chloride gas with the metallurgical grade silicon powder.

In order to obtain fine bubbles of hydrogen chloride gas, the heat transfer tube may be disposed as close to the center of the reactor as possible. However, in this case, the metallurgical grade silicon powder collides against the outer surface of the heat transfer tube along with the hydrogen chloride gas, so that erosion is likely to occur on the heat transfer tube.

The present invention has been made in view of the above situation, an object of which is to provide an apparatus and method for producing trichlorosilane in which hydrogen chloride gas introduced from the bottom part of the reactor contributes effectively to a reaction even at the upper part of the reactor, thereby attaining a higher reaction efficiency while suppressing erosion of the heat transfer tube.

The apparatus for producing trichlorosilane of the present invention comprises a reactor, a raw material supply device that supplies metallurgical grade silicon powder as raw material to the reactor, a gas introduction device that introduces hydrogen chloride gas to the reactor so that the hydrogen chloride gas reacts with the metallurgical grade silicon powder while the metallurgical grade silicon powder is fluidized by the hydrogen chloride gas, a gas discharge device that discharges generated gas containing trichlorosilane from the reactor, a plurality of gas flow controlling members installed in a central space of the reactor along the vertical direction, and a heat transfer tube which is installed vertically in an annular space enclosing the central space of the reactor and through which a heating medium passes.

Inside the reactor, the reaction takes place most actively at the lower part thereof and raises the temperature therein. Further, since hydrogen chloride gas also ascends from therebelow, an upward flows takes place in a fluidized bed where currents ascend in the vicinity of the center of the reactor. In addition, the upward flow passes through a space between the gas flow controlling members. Therefore, as the upward flow contacts with (or collide against) the gas flow controlling members, growth of bubbles of the hydrogen chloride gas is suppressed. In addition, a great number of relatively fine bubbles remain even at the upper part of the reactor. Accordingly, there is an increase in contact area between hydrogen chloride gas and the metallurgical grade silicon powder which improves the reaction efficiency.

In this case, the heat transfer tube is provided in the annular space outward from the gas flow controlling members, so that the gas flow controlling members are likely to collide against the upward flow that occurs at the center of the reactor and easily becomes worn. On the contrary, since the heat transfer tube is installed in the annular space that avoids the upward flow, it is less likely to become worn. In addition, since the heat transfer tube is cooled by the heating medium during the reaction, it is hardly affected by the hydrogen chloride gas. In addition, since the heat transfer tube is installed to stand close to the inner peripheral wall of the reactor, the inner wall of the reactor is less likely to be influenced by corrosion caused by the hydrogen chloride gas. In addition, the gas flow controlling member may be formed in a bar shape, a tube shape, a belt shape, or the like. In this case, it does not circulate a heating medium or the like in the gas flow controlling member unlike the heat transfer tube, and it should be replaced with a new member while the erosion thereof is low.

The apparatus for producing trichlorosilane of the present invention, further comprises a cylindrical member which constitutes a part of a wall of an upper part of the reactor and is detachably provided on a body of the reactor and a holed guide member which has a plurality of through-holes and is provided inside the body, wherein an upper end portion of the heat transfer tube is supported by the cylindrical member, the gas flow controlling member is positioned in and through the holed guide member and is supported at an upper portion and a lower portion along the length of the gas flow controlling member.

In the apparatus for producing trichlorosilane having the above-mentioned configuration, when the reactor is assembled, in a state where the heat transfer tube is supported by the cylindrical member, as the heat transfer tube is placed into the body, the cylindrical member is fixed to the body. Thereafter, the gas flow controlling member is positioned in and through the holed guide member from above. Accordingly, the assembling operation is simple, and maintenance such as replacement of the gas flow controlling member can be easily performed. In the case where the gas flow controlling member is held so as to be inserted into the holed guide member, the gas flow controlling member may be directly held to the holed guide member, or may be held to the cylindrical member or the like via a frame or the like. The gas flow controlling member may be fixed to the holed guide member or the frame by fixing means or soldering.

In the apparatus for producing trichlorosilane of the present invention, a large diameter portion greater in diameter than the body of the reactor is connected to the body, and the cylindrical member constitutes at least a part of a wall of the large diameter portion.

Trichlorosilane gas generated in the reactor is discharged from the upper end of the reactor. It is, however, necessary to prevent as much metallurgical grade silicon powder, a composition of the fluidized bed as possible from being discharged from a discharge port of the trichlorosilane gas. The large diameter portion is disposed at the upper part of the reactor, by which upward flows are decreased in speed in the fluidized bed at the concerned part and the metallurgical grade silicon powder ascending together with the upward flow freely falls into the downward flow. Therefore, it is possible to reduce the collision force of the metallurgical grade silicon powder at the upper end of the heat transfer tube protruding inward in the radial direction from the cylindrical member of the large diameter portion, thereby preventing erosion. In addition, the gas flow controlling members may be arranged so that the upper end is equal in height to the lower end of the large diameter portion or may be kept low to such an extent that they will not reach the large diameter portion. The inner diameter of the large diameter portion is preferably in a range from about 1.3 to 1.6 times with respect to the inner diameter of the lower part of the reactor.

The method for producing trichlorosilane of the present invention comprises providing a heat transfer tube in an annular space enclosing a central space of a reactor along a vertical direction, providing a plurality of gas flow controlling members in the central space of the reactor along the vertical direction, passing a heating medium through the heat transfer tube, supplying metallurgical grade silicon powder as a raw material to the reactor, introducing hydrogen chloride gas to the reactor from below, reacting the metallurgical grade silicon powder with the hydrogen chloride gas while the metallurgical grade silicon powder is fluidized by the hydrogen chloride gas and the metallurgical grade silicon powder and hydrogen chloride gas flow upward between the gas flow controlling members, and discharging gas containing trichlorosilane from a top part of the reactor.

In the apparatus and method for producing trichlorosilane, the growth of bubbles of hydrogen chloride gas is suppressed by the gas flow controlling members to make the hydrogen chloride gas contribute effectively to a reaction even at the upper part of the rector, thereby attaining a higher reaction efficiency. In addition, since the heat transfer tube is installed in the annular shape outward from the gas flow controlling member, upward flow is less likely to collide against the heat transfer tube, and this prevents the erosion of the heat transfer tube, thereby enhancing the durability thereof. In addition, since the heat transfer tube is installed to stand close to the inner peripheral wall of the reactor, the inner peripheral wall of the reactor is less likely to be influenced by corrosion caused by the hydrogen chloride gas.

BRIEF DESCRIPTION OF THE DRAWINGS

FIG. 2A illustrates a state where a pressing frame and gas flow controlling members are omitted, and FIG. 2B illustrates the pressing frame.

FIGS. 5A to 5D are longitudinal sectional views showing a process of assembling a reactor shown in FIG. 1 in the order from FIG. 5A to FIG. 5D.

DETAILED DESCRIPTION OF THE INVENTION

Figure 1:
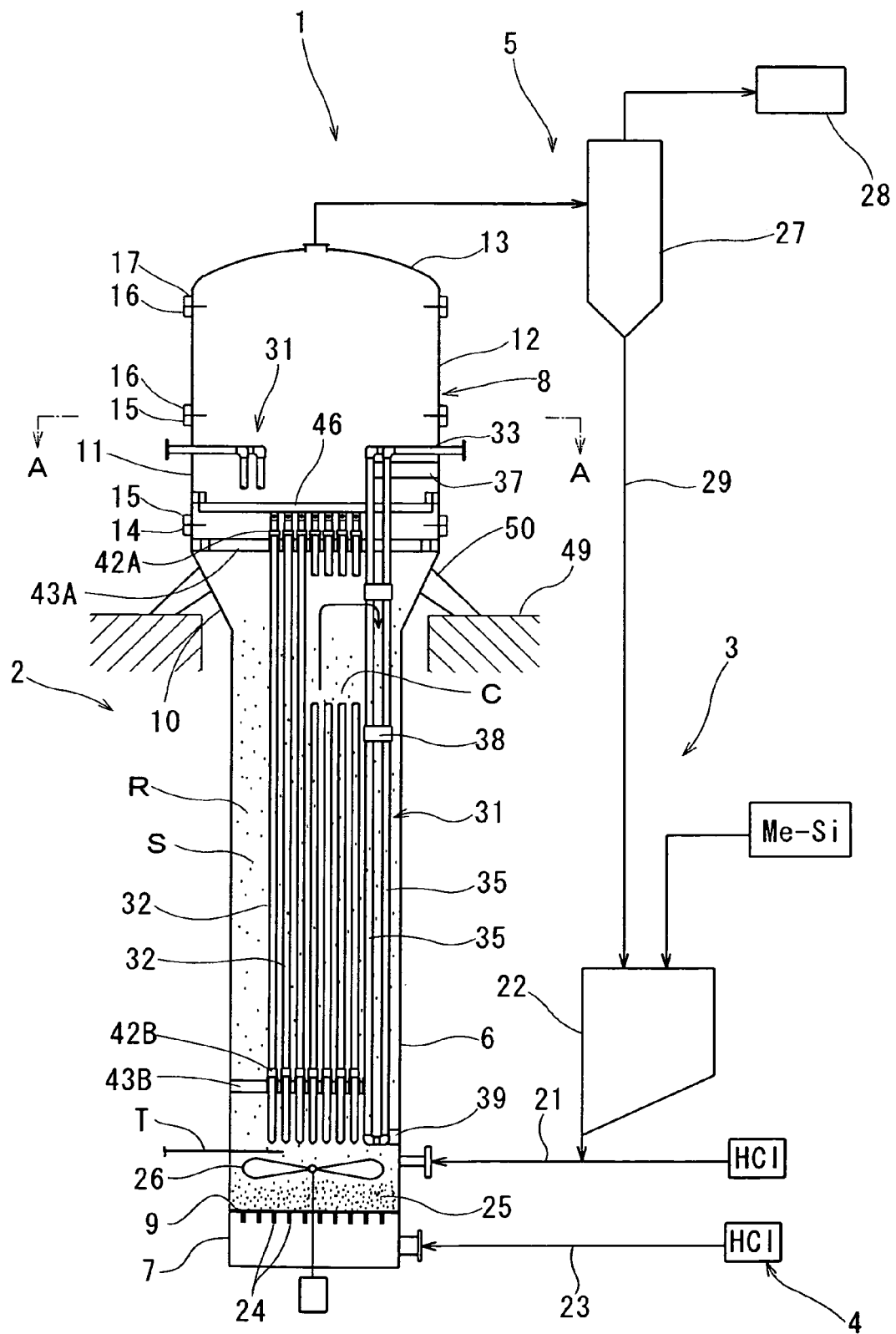
FIG. 1 is a longitudinal sectional view showing an embodiment of an apparatus for producing trichlorosilane of the present invention.

Hereinafter, an explanation will be made of an embodiment of the present invention with reference to the drawings.

An apparatus 1 for producing trichlorosilane is provided with a reactor 2, raw material supply device 3 for supplying metallurgical grade silicon powder (Me-Si) as a raw material to the reactor 2, a gas introduction device 4 for introducing hydrogen chloride gas (HCl) which reacts with the metallurgical grade silicon powder, and a gas discharge device 5 for discharging the generated gas containing trichlorosilane.

The reactor 2 is provided with a body 6 formed substantially in a straight cylindrical shape along the vertical direction, a bottom 7 connected to the lower end of the body 6, and a large diameter portion 8 connected coaxially to the upper end of the body 6. In this embodiment, the body 6 is formed with a substantially similar diameter to the bottom 7 and the space therebetween is partitioned by a horizontal partition plate 9. On the other hand, a tapered portion 10 is formed at the upper part of the body 6, and the large diameter portion 8 is integrally connected to the upper end of the tapered portion 10. The diameter of the tapered portion 10 gradually increases in the upper direction thereof. Thus, the internal space of the body 6 is communicatively connected to that of the large diameter portion 8. In this embodiment, the inner diameter of the large diameter portion 8 is set to be 1.3 to 1.6 times greater than the inner diameter of the body 6. For example, the inner diameter of the body 6 is about 1.6 m, and the inner diameter of the large diameter portion 8 is about 2.3 m.

In addition, in this embodiment, the large diameter portion 8 has three members including a lower cylindrical member 11, an upper cylindrical member 12, and an upper cover 13. The upper end of the body 6, both ends of the both cylindrical member 11 and 12, and the lower end of the upper cover 13 are provided with respective flanges 14 to 17. And the upper end of the body 6, both ends of the both cylindrical member 11 and 12, and the lower end of the upper cover 13 are assembled to be attached or detached by the flanges 14 to 17.

The raw material supply device 3 supplies metallurgical grade silicon powder (Me—Si) (for example, the size is 1 μm or more and 1000 μm or less) from a raw material feed hopper 22 via a raw material supply tube 21 connected to the lower part of the body 6 of the reactor 2. In this configuration, the metallurgical grade silicon powder is supplied by gas transportation using hydrogen chloride gas (HCl) as a carrier gas.

On the other hand, the gas introduction device 4 introduces hydrogen chloride gas (HCl) into the bottom 7 of the reactor 2 via a gas supply tube 23.

A plurality of nozzles 24 is fixed along the vertical direction so as to penetrate the partition plate 9 which partitions the bottom 7 of the reactor 2 from the body 6. The upper end openings of the nozzles 24 are arranged inside the body 6 and the lower end opening is arranged inside the bottom 7. Then, hydrogen chloride gas introduced by the gas introduction device 4 into the bottom 7 of the reactor 2 is ejected dispersively into the body 6 by each of the nozzles 24.

Further, dispersing materials 25 formed in a ball shape, a plate-shaped small pieces with hole or the like are laid densely on the partition plate 9, and an agitator 26 is installed so as to provide agitation above the layer of the dispersing materials 25.

The gas discharge device 5 sends the reacted fluid including trichlorosilane discharged from the reactor 2 to a gas purifying system 28 via a cyclone 27, and collects the metallurgical grade silicon fine powder (for example, the diameter is 5 μm or more and 40 μm or less) discharged along with the reacted fluid in the cyclone 27 to be returned to the raw material feed hopper 22 via a recovery tube 29.

A plurality of heat transfer tubes 31 through which a heating medium passes and a plurality of gas flow controlling members 32 are installed inside an internal space to extend from the body 6 to the large diameter portion 8.

Figure 2A:
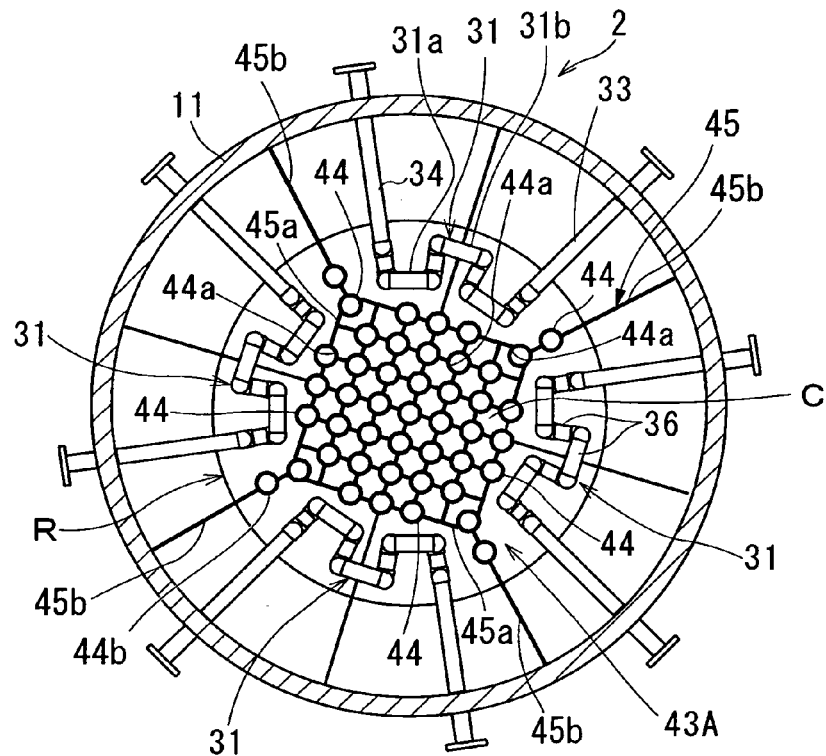
FIGS. 2A and 2B are sagittal enlarged sectional views taken along the line A-A in FIG. 1, and specifically.
Figure 2B:
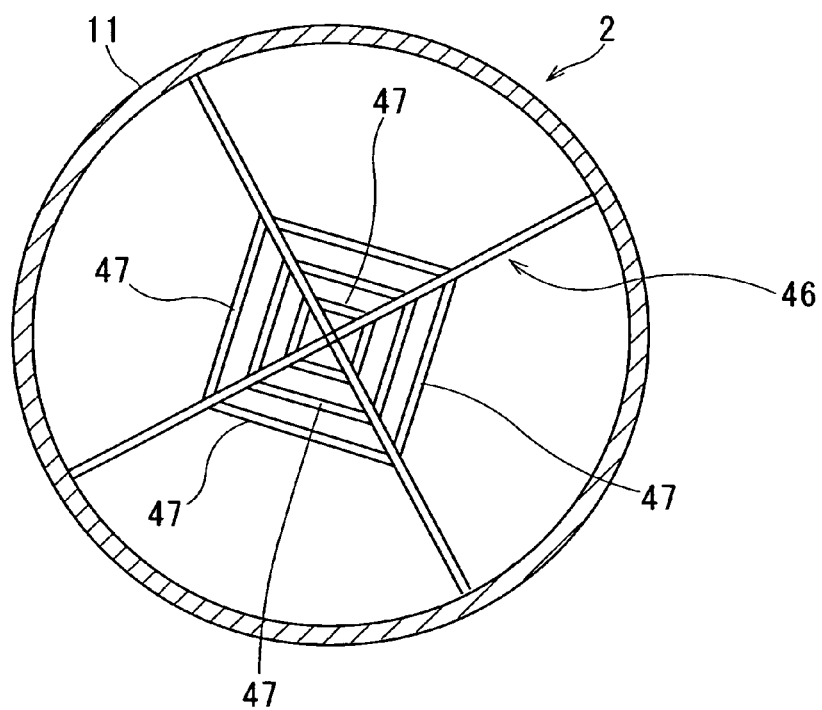
Figure 3:
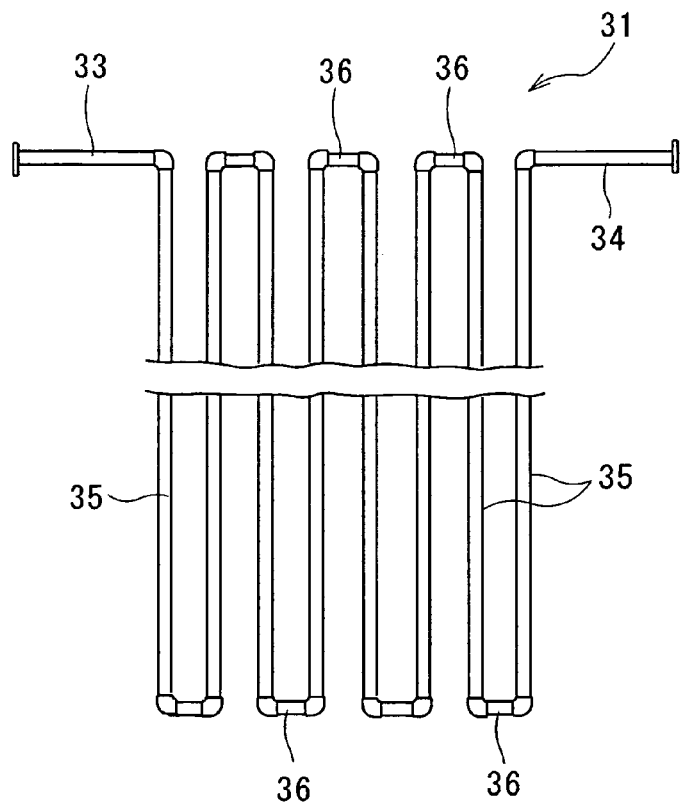
FIG. 3 is a development view of a heat transfer tube shown in FIG. 1.

A plurality of groups (in the example shown in FIG. 2A, four groups at an interval of 90°) of the heat transfer tubes 31 are installed circumferentially at certain intervals in an annular space R adjacent to the inner peripheral wall in the internal space of the body 6. As shown in FIGS. 1 to 3, each group of the heat transfer tubes 31 has a plurality of longitudinal tubes 35 running along the vertical direction and connection tubes 36 connecting the upper ends and the lower ends of the longitudinal tubes 35 alternatively, between an inlet tube 33 and an outlet tube 34 so as to form repeated upper and lower reciprocation passages between the inlet tube 33 and the outlet tube 34. The inlet tube 33 and the outlet tube 34 penetrate through a wall of the lower cylindrical member 11 of the large diameter portion 8. Further, the upper end part of the longitudinal tube 35 of the heat transfer tube 31 is fixed to the inner peripheral wall of the lower cylindrical member 11 by a bracket 37, the longitudinal tubes 35 are connected together at a plurality of points by a swinging prevention member 38, and the lower end thereof is fixed to the inner peripheral wall of the body 6 by a bracket 39.

Figure 4:
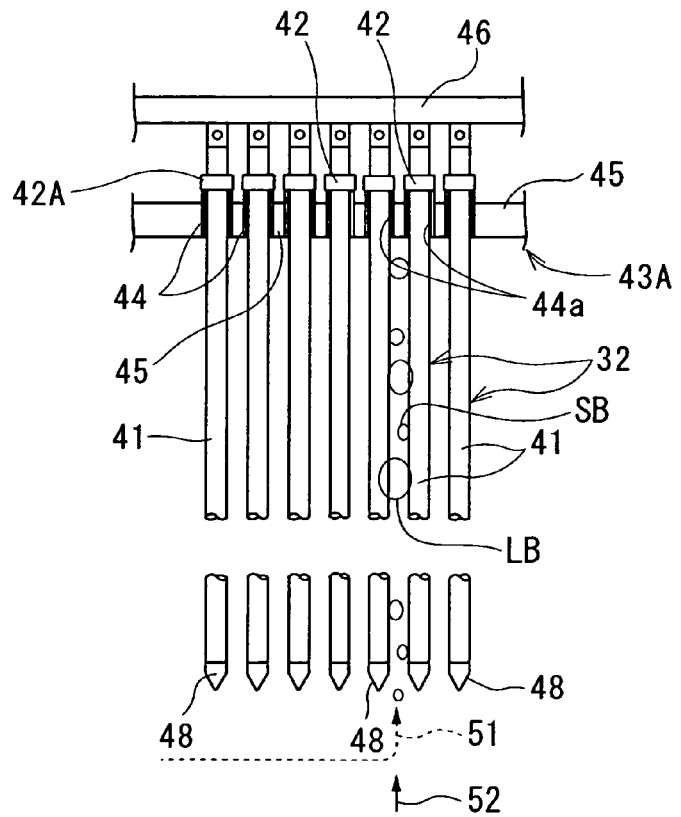
FIG. 4 is a partial enlarged view of the gas flow controlling members shown in FIG. 1.

A plurality of the gas flow controlling members 32 are installed along the vertical direction in the central space C enclosed with the heat transfer tubes 31. The gas flow controlling member 32 is formed by closing both ends of an internally hollow tube 41, the cross section of which is, for example, circular, and as illustrated in FIG. 4 or FIG. 5C, the upper end part and the lower end part thereof are formed integrally with diameter-enlarged portions 42A and 42B, respectively. In addition, holed guide members 43A and 43B by which the gas flow controlling member 32 is supported at an upper portion and a lower portion along the length direction, are fixed respectively to the lower cylindrical member 11 of the large diameter portion 8 in the reactor 2 and the lower part of the body 6. As illustrated in FIG. 2A or FIG. 5B to 5D, each of the holed guide members 43A and 43B is provided with guide tube 44 having through-holes 44a through which the gas flow controlling members 32 are inserted one by one to be movable along the vertical direction, and frames 45 which are formed integrally with the rings to fix the guide tube 44 in columns and rows at predetermined intervals. The frames 45 include grid frames 45a arranged in the central space C enclosed with the heat transfer tubes 31 and supporting frames 45b connecting the grid frames 45a with a inner wall of the lower cylindrical member 11. A guide tube 44b having through-holes 44a through which the gas flows controlling members 32 are inserted one by one to be movable along the vertical direction may be arranged at the supporting frames 45b. A guide tube 44b may be arranged between the adjacent gas flow controlling members 32 for holding the gas flow controlling member 32 which rectifies a down flow of the metallurgical grade silicon powder and gas flow. In this case, the guide tube 44 of the holed guide members 43A and 43B are arranged densely at the central space C enclosed with the annular space R of the body 6, and for example, a number of (for example, forty five) the guide tube 44 are disposed in an square area (central space C) of 1 m² formed by the frames 45 in the body 6 having an inner diameter of about 1.6 m. A plurality of (in the illustrated example, 8) the frames 45 are provided on the inner peripheral wall of the body 6 in the radial direction in the outer peripheral portion of the annular space R. A length of a diagonal line of the quadrate frame 45 including the whole grid frames 45a (the square area) may be 20% or more and 65% or less of a length of a diameter of the lower cylindrical member 11. A shape of the grid frames 45a is not limited the quadrate, may be a honeycomb patterns or concentric circle patterns.

In other words, in the reactor 2 of the present invention, the gas flow controlling members 32 are installed in the central space C of the reactor 2, the heat transfer tubes 31 are installed between the gas flow controlling members 32 and the inner wall of the lower cylindrical member 11. The heat transfer tubes 31 may have inside tubes 31a and outside tubes 31b. The inside tubes 31a may be arranged in an area spanning from the center of the lower cylindrical member 11 to 30% or more and 50% or less of the radius of the lower cylindrical member 11. The outside tubes 31b may be arranged in an area spanning from the center of the lower cylindrical member 11 to 50% or more and 70% or less of the radius of the lower cylindrical member 11. In the present invention, the radius or diameter of the lower cylindrical member 11 means the radius or diameter of an inner periphery of the lower cylindrical member 11.

The through-holes 44a of the guide tube 44 of the upper holed guide member 43A are larger than those of the lower holed guide member 43B in inner diameter. With regard to the diameter-enlarged portions 42A and 42B of the gas flow controlling member 32, the lower diameter-enlarged portion 42B has smaller outer diameter than the upper diameter-enlarged portion 42A. With regard to the holed guide members 43A and 43B and the diameter-enlarged portions 42A and 42B of the gas flow controlling members 32, the inner diameter of the through-holes 44a of the upper holed guide member 43A is smaller than the outer diameter of the upper diameter-enlarged portion 42A of the gas flow controlling member 32 but is larger than the outer diameter of the lower diameter-enlarged portion 42B, and the inner diameter of the through-holes 44a of the lower holed guide member 43B is smaller than the outer diameter of the lower diameter-enlarged portion 42B of the gas flow controlling member 32. Therefore, the gas flow controlling member 32 is supported so as to be suspended from the holed guide member 43A as the upper diameter-enlarged portion 42A is supported on the guide tube 44 of the upper holed guide member 43A, and the lower diameter-enlarged portion 42B is detachably disposed on the guide tube 44 of the lower holed guide member 43B.

In addition, a pressing frame 46 which comes in contact with and holds the upper end of the gas flow controlling member 32 is provided in the large diameter portion 8 of the reactor 2. The pressing frame 46 is, as shown in FIG. 2B, configured by assembling a plurality of strip-shaped plate members 47 into rectangular frame shapes, so that the plate members 47 come in contact with and press against the upper end of the gas flow controlling member 32 in columns or rows of the gas flow controlling member 32 which is supported by the holed guide members 43A and 43B in rows. The pressing frame 46 prevents the gas flow controlling member 32 from lifting up by the upward flows of the gas. When the pressing frame 46 is provided in the large diameter portion 8, an enough space (a margin) between the upper end of the gas flow controlling member 32 and the plate members 47 is left for admitting a thermal expansion of the gas flow controlling member 32.

In this embodiment, each of the gas flow controlling members 32 is formed so as to be shorter than the heat transfer tube 31, and the lower end of the gas flow controlling members 32 is installed so as to be substantially equal in height to the lower end of the heat transfer tube 31. However, the upper end of the gas flow controlling members 32 is arranged below from the upper end of the heat transfer tube 31, and the gas flow controlling members 32 are arranged from the lower end part of the large diameter portion 8 of the reactor 2 to the lower part of the body 6.

Further, as shown in FIG. 4, a leading end member 48 projecting in a cone shape is fixed to the lower end of the gas flow controlling member 32, and a cone-shaped (conical shape) convex face is arranged with the face turned downward.

The gas flow controlling members 32 have, for example, an outer diameter of 50 mm, and they are supported penetrably by the upper and lower holed guide members 43A and 43B, and each gas flow controlling member 32 is disposed at gaps between the outer surfaces of the gas flow controlling members 32 of 50 to 150 mm in the above-mentioned area (central space C) of about 1 m$^2$ in the body 6 having an inner diameter of about 1.6 m. The length of the gas flow controlling member 32 is in the range of 6 to 7 m. In addition, the tapered portion 10 at the upper part of the body 6 of the reactor 2 is fixed by supporting legs 50 on a ground 49 and reactor 2 is supported so as to be suspended from the supporting legs 50.

As illustrated in FIG. 1, a thermometer T is set at the lower part of the body 6, a temperature of the lower part of the body 6 is measured by the thermometer T for controlling the temperature of the heat medium passing through the heat transfer tubes 31.

An explanation will be made for a method for producing trichlorosilane by using the apparatus 1 for producing trichlorosilane.

Metallurgical grade silicon powder is supplied into the reactor 2 by gas transportation through a raw material supply tube 21. In this embodiment, a hydrogen chloride gas is used as a carrier gas for gas transportation, and the supply quantity of the metallurgical grade silicon powder is adjusted by controlling the carrier gas flow rate.

Further, the gas introduction device 4 is used to introduce hydrogen chloride gas into the bottom 7 of the reactor 2. In the partition plate 9, the nozzles 24 is installed so as to be communicatively connected between the bottom 7 of the reactor 2 and the body 6 of the reactor 2. The hydrogen chloride gas is supplied into the body 6 via nozzles 24. The metallurgical grade silicon powder S is supplied to the upper surface of the partition plate 9. Furthermore, the metallurgical grade silicon powder S reacts with the hydrogen chloride gas, while being fluidized, together with the upward flow of hydrogen chloride gas from below.

Since the reaction of the metallurgical grade silicon powder S with hydrogen chloride gas is an exothermic reaction, a fluidized mixture thereof enters a high-temperature state and ascends through the center of the body 6. Since the aggregate of the gas flow controlling members 32 is provided at the center of the body 6, the fluidized mixture ascends through the aggregate of the gas flow controlling members 32. Here, the hydrogen chloride gas exists in the fluidized mixture as bubbles, and the bubbles grow greater as they ascend upward. However, in this embodiment, the growing bubbles contacts with (or collide against) the gas flow controlling members 32 standing close together while passing through the aggregate of the gas flow controlling members 32, and ascend after they are broken into bubbles relatively small in diameter.

Therefore, hydrogen chloride gas introduced from the bottom 7 of the reactor 2 ascends up to the upper part of the reactor 2, with the bubbles kept relatively small in diameter, and, in the meantime, the gas is in contact with the metallurgical grade silicon powder to react with metallurgical grade silicon powder, thereby generating trichlorosilane. Then, the contact area of the bubbles with the metallurgical grade silicon powder is increased due to the smaller diameter bubbles, thereby improving the reaction efficiency.

Then, a gas containing trichlorosilane ascended to the upper part of the body 6 of the reactor 2 is discharged from the top part of the reactor 2 into the gas discharge device 5.

The above matter will be explained by referring to the pattern diagram of FIG. 4. The metallurgical grade silicon powder supplied as shown by the broken line arrows 51 is mixed with the hydrogen chloride gas shown by the solid line arrows 52 to be fluidized and both of them are made to ascend together. Bubbles LB of the hydrogen chloride gas which grow greater according to the ascent are bought into contact with the gas flow controlling members 32. Since the plural gas flow controlling members 32 are arranged so as to be in close proximity to each other, the bubbles LB is jammed between the gas flow controlling members 32 and divided into bubbles SB relatively small in diameter while ascending. The divide of the bubbles are performed constantly.

In an initial operational stage of the heat transfer tube 31, a fluid heated to a high temperature of, for example, 300° C. as a heating medium is flowed to accelerate the reaction between the metallurgical grade silicon powder and the hydrogen chloride gas. However, when the reactions continue, the temperature increases to a high temperature of several hundreds or more ° C. since the reaction is an exothermic reaction. Therefore, in order to suppress the increase in temperature of the fluidized bed, the cooled heating medium passes through the heat transfer tube 31. Therefore, the temperature of the annular space R in the vicinity of the inner peripheral wall of the body 6 is lower than that at the center of the body 6. As the heating medium, for example, dibenzyltoluene available in a temperature range of −30° C. to 350° C. is used. As mentioned above, the temperature of the heat medium is controlled on the basis of the measurements which the thermometer T measures the thermometer T is set at the lower part of the body 6.

Since the inner diameter of the reactor 2, from the tapered portion 10 to the large diameter portion 8 in the upper part of the reactor 2, gradually becomes greater than that of the body 6, the pressure decreases of a gas containing trichlorosilane in the fluidized mixture, and the velocity of the upward flow gradually decreases. Therefore, unreacted metallurgical grade silicon powder S ascending by the upward flow falls down in the vicinity of the annular space R installed the heat transfer tubes 31 as shown by an arrow in FIG. 1. Since the annular space R is cooled by the heat transfer tubes 31, the upward flow at the center of the reactor 2 is changed to a downward flow passing through the annular space R via the upper part of the body 6 (the vicinity of the tapered portion 10).

Therefore, with regard to the heat transfer tube 31, since the force of the upward flow is weak at the inlet tube 33 and the outlet tube 34 of the upper ends thereof, the collisions within the metallurgical grade silicon powder are weak, and since the downward flow of the metallurgical grade silicon powder at the longitudinal tube 35 is close to free fall, erosion thereof is reduced.

In addition, as the heat transfer tube 31 is provided adjacent to the inner peripheral wall of the body 6, the wall of the body 6 cools easily, and the body 6 is less likely to be influenced by corrosion caused by the hydrogen chloride gas in the body 6.

In addition, although the lower end of the gas flow controlling member 32 collides with the upward flow, since the leading end member 48 is formed in a convex face protruding downward, it is possible to reduce resistance against the upward flow, thereby reducing erosion. A cemented carbide or the like may be used to give a erosion-resistant coating to the convex face. The convex face may be formed as a circular arc face or a hemisphere face, in addition to as a conical face.

Since the gas flow controlling member 32 is provided with the large diameter portion 42A and 42B at the upper and lower parts thereof, if there are cracks at positions midway therebetween, it is supported by the upper holed guide member 43A and the lower holed guide member 43B, thereby preventing the falling of the gas flow controlling member 32 which may cause breakage of the agitator 26 or the like.

Next, an explanation will be made for disassembling and assembling operations of the reactor 2 in the apparatus 1 for producing trichlorosilane having the above-mentioned configuration.

First, the assembling operation will be described. The large diameter portion 8 of the reactor 2 is divided into the three members consisting of the lower cylindrical member 11, the upper cylindrical member 12, and the upper cover 13, the three members are separated from the body 6 to leave the top of the body 6 open. As illustrated in FIG. 5A, the heat transfer tube 31 is supported by the lower cylindrical member 11, and the lower cylindrical member 11 is placed on the upper end of the body 6 as the heat transfer tube 31 is inserted into the body 6. Then, the flanges 14 and 15 thereof are joined. As illustrated in FIG. 5B, the holed guide members 43A and 43B are fixed to the upper and lower parts of the body 6. Next, as illustrated in FIG. 5C, the gas flow controlling members 32 are suspended and lowered from above one by one to be inserted into the respective through-holes 44a of the guide tube 44 of the holed guide members 43A and 43B, and the diameter-enlarged portion 42A at the upper end portion thereof is supported to be suspended by the guide tube 44 of the upper holed guide member 43A. Since the lower diameter-enlarged portion 42B has a smaller outer diameter than the through-hole 44a of the guide tube 44 of the upper holed guide member 43A, it is able to pass through the upper holed guide member 43A and be disposed on the guide tube 44 of the lower holed guide member 43B. After all of the gas flow controlling members 32 are supported to be suspended, as illustrated in FIG. 5D, the pressing frame 46 is supported by the lower cylindrical member 11 to press the upper end of the gas flow controlling members 32. Thereafter, the upper cylindrical member 12 and the upper cover 13 are fixed.

As described above, the heat transfer tubes 31 are installed in the annular space R adjacent to the inner peripheral wall of the body 6, the gas flow controlling members 32 are provided in the inner space thereof so as to divide the installation space of the heat transfer tubes 31 from that of the gas flow controlling members 32, and the heat transfer tubes 31 are fixed to the lower cylindrical member 11 so as to be assembled integrally therewith. In addition, the gas flow controlling members 32 are inserted through the holed guide members 43A and 43B and supported so as to be suspended from above, which means that the assembly operation is easy.

The disassembling operation can be performed in the reverse order of the assembly operation. Specifically, after removing the upper cover 13 and the upper cylindrical member 12, the pressing frame 46 is removed to pull the gas flow controlling members 32 upward, the holed guide members 43A and 43B are removed, and the heat transfer tubes 31 and the lower cylindrical member 11 are then pulled up together.

As described above, since the disassembly and assembly operations of the reactor 2 are easy, maintenance, such as replacement of the worn gas flow controlling member 31, can be easily performed.

While preferred embodiments of the present invention have been described and illustrated above, it should be understood that these are exemplary of the present invention and are not to be considered as limiting. For example, the number or length of the heat transfer tubes and the gas flow controlling members may be changed appropriately depending on the size of the reactor.

In addition, although the heat transfer tube is fixed to the wall of the cylindrical member, a configuration in which a heat transfer tube penetrating through a wall of a cylindrical member is connected to the wall with an elastic member such as a bellows so as to allow the heat transfer tube to move relative to the cylindrical member. Although the gas flow controlling member is configured by a tube having a circular cross section, it may also be configured with a tube of which the cross section is rectangular, triangular, or the like. In addition to the tubular shape, various shapes such as a plate shape with a small width or a cross shape in a transverse cross section configured by joining two plate-shaped members, may be employed. In addition, although the diameter-enlarged portion having a larger diameter than the through-hole of the holed guide member is provided in the gas flow controlling member so as to be carried and supported by the holed guide member while being suspended, a frame member for supporting and suspending the upper end portion of the gas flow controlling member may be provided in the lower cylindrical member or the like.

What is claimed is:

1. An apparatus for producing trichlorosilane comprising:
   a reactor;
   a raw material supply device that supplies metallurgical grade silicon powder as raw material to the reactor;
   a gas introduction device that introduces hydrogen chloride gas to the reactor so that the hydrogen chloride gas reacts with the metallurgical grade silicon powder while the metallurgical grade silicon powder is fluidized by the hydrogen chloride gas;
   a gas discharge device that discharges generated gas containing trichlorosilane from the reactor;
   a plurality of gas flow controlling members each having on an upper portion an upper diameter-enlarged portion and each having on a lower portion a lower diameter-enlarged portion and each of the plurality of gas flow controlling members being suspended in a central space of the reactor along the vertical direction;
   a first member connected to the reactor for suspending the plurality of gas flow controlling members at the upper diameter-enlarged portion;

a second member connected to the reactor for detachably disposing thereon the lower diameter-enlarged portion of the plurality of gas flow controlling members; and a heat transfer tube which is installed vertically in an annular space enclosing the central space of the reactor and through which a heating medium passes.

2. The apparatus according to claim 1, further comprising:

a cylindrical member which constitutes a part of a wall of an upper part of the reactor and is detachably provided on a body of the reactor; and the first member for suspending the plurality of gas flow controlling members being a holed guide member which has a plurality of through-holes and is provided inside the body, wherein an upper end portion of the heat transfer tube is supported by the cylindrical member and the gas flow controlling members are positioned in and through the holed guide member.

3. The apparatus according to claim 2, wherein a large diameter portion greater in diameter than the body of the reactor is connected to the body, and the cylindrical member constitutes at least a part of a wall of the large diameter portion.

4. The apparatus according to claim 1, wherein the heating medium accelerates the reaction between the metallurgical grade silicon powder and the hydrogen chloride gas.

5. The apparatus according to claim 4, wherein the heating medium is dibenzyltoluene.

6. The apparatus according to claim 4, wherein the heating medium is at a temperature range of −30° C. to 350° C.

7. The apparatus according to claim 1, further comprising a thermometer located at a lower part of the reactor.

8. The apparatus according to claim 1, wherein unreacted metallurgical grade silicon powder ascending by an upward flow falls down into the annular space.

9. The apparatus according to claim 2, further comprising:

a pressing frame which is detachable from the reactor, wherein, each of through holes is provided in a plurality of guide tubes respectively, the upper diameter-enlarged portion is supported on a top end of the guide tube so as to suspend the gas flow controlling members on the holed guide member, the pressing frame prevents the gas flow controlling members from being lifted up by an upward flows of a gas.

* * * * *